Sept. 1, 1959  G. D. PAGE  2,902,253
ROTARY PLUG VALVE
Filed Oct. 18, 1956
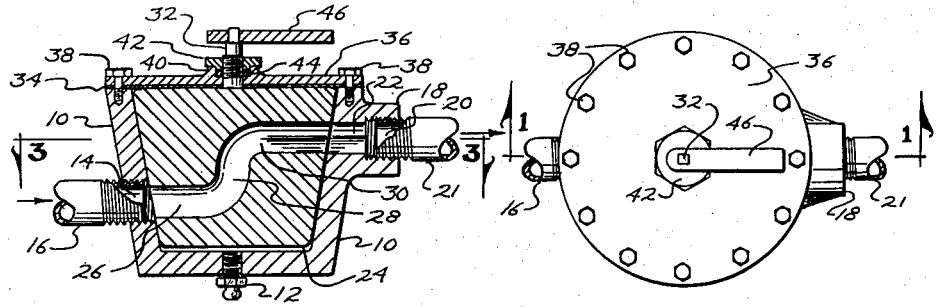
Fig. 1.  Fig. 2.
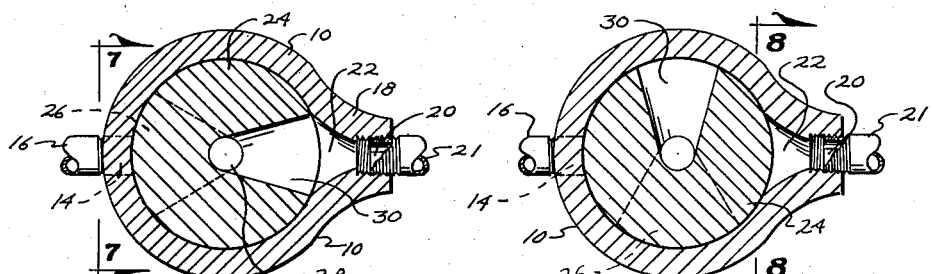
Fig. 3.  Fig. 4.
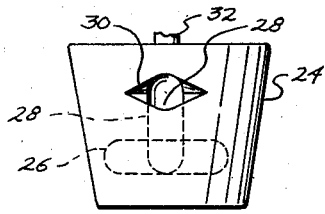 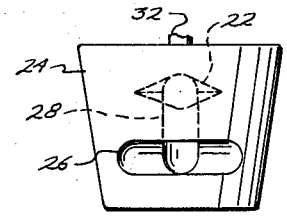
Fig. 5.  Fig. 6.
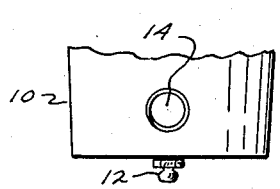 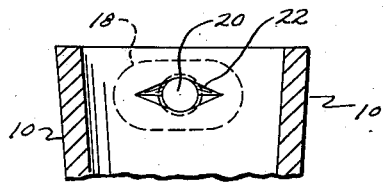
Fig. 7.  Fig. 8.
INVENTOR.
George D. Page
BY
M. Talbert Dick
ATTORNEY
Witness.
A. J. Martin 2,902,253

ROTARY PLUG VALVE

George D. Page, Oskaloosa, Iowa

Application October 18, 1956, Serial No. 616,803

2 Claims. (Cl. 251—209)

My invention relates to the art of pressure valves and more particularly to those manually actuated pressure valves used in pressure circuits where the rate of flow must be strictly regulated.

Valves of many descriptions have been used in hydraulic and gaseous circuits for many decades. Some of these valves have been designed to accurately regulate the flow of the fluid or gas within their respective systems. However, the valves known to me have certain shortcomings which often impair the efficiency of the pressure system, or which at least make it difficult for any degree of efficiency to be obtained.

The first difficulty of the valves known to me is lack of sensitivity of the valve per unit of displacement of the manual control means. Thus, a slight movement of the manual control lever or wheel on these valves cannot be depended upon to bring about an ascertainable change in flow of matter through the valve. Since these valves are not really sensitively responsive to a slight movement of their control means, it has herebefore been necessary to obtain a sensitive adjustment on these valves by "gearing" the valve down so that a substantial finite displacement of the manual means could bring about a very slight finite change in the rate of flow through the valve.

A further disadvantage of the valves known to me is that the valves which can obtain sensitive adjustments are confined to a small range of flow valves. Thus, if they are adapted to permit very small rates of flow, they are not also readily adapted to permit large rates of flow.

A still further disadvantage of the valves known to me is that the manual control lever or wheel must undergo much displacement to move the valve through its range of flow valves from closed to maximum flow.

A still further disadvantage of the valves known to me is that they require complete disassembly for lubrication purposes, or provide no lubrication means at all.

Therefore, the principal object of my invention is to provide a pressure valve whose rate of flow can be sensitively adjusted by a very small corresponding displacement of the manual control means.

A further object of my invention is to provide a sensitive pressure valve which can permit infinitely small and substantially large rates of flow.

A still further object of my invention is to provide a pressure valve which can be changed from its closed position to its maximum flow position with only a small displacement of the manual control means.

A still further object of my invention is to provide a pressure valve which is self-lubricating.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a vertical sectional view of my device taken on line 1—1 of Fig. 2 and showing the path of the pressurized fluid or gas as it passes through the opened valve;

Fig. 2 is a plan view of my device;

Fig. 3 is a horizontal sectional view of my device taken on line 3—3 of Fig. 1 and showing the valve in its full open position;

Fig. 4 is a horizontal sectional view of my device, very similar to that of Fig. 3, except that the valve is in its closed position;

Fig. 5 is an elevation of the outlet side of the core of my valve;

Fig. 6 is an elevation of the inlet side of the core of my valve;

Fig. 7 is an elevation taken on line 7—7 of Fig. 3, showing the inlet side of my valve; and Fig. 8 is a partial sectional view showing the outlet side of my valve.

I have used the numeral 10 to designate the housing of my valve which can be slightly tapered towards its lower end. A conventional grease nipple 12 is disposed through the bottom of housing 10 so that a lubricant can be introduced into the interior of the housing. A circular inlet opening 14 is placed in the side of housing 10 and is adapted to receive a threaded conduit 16. Located on the side of housing 10 generally opposite from and above inlet opening 14 is shoulder 18 which contains a circular outlet opening 20. Outlet opening 20 is also adapted to receive a threaded conduit 21. As shown in Fig. 4, outlet opening 20 expands into a widened area 22 within shoulder 18. Widened area 22 is diamond-shaped in cross section, as shown in Fig. 8, and it is more desirable to have the width of area 22 greater than its effective height.

A core member 24 is adapted to be rotatably secured within housing 10. Core 24 can also have its sides tapered towards the bottom so as to coincide with the interior shape of housing 10. The tapered shape of core 24 and housing 10 will assist in the distribution of any lubricant introduced through nipple 12. An elongated horizontal slot 26 is in one side of core 24 and is adapted to register at times with inlet opening 14 in the housing member. The circular ends of slot 26 have substantially the same radius as inlet opening 14. Slot 26 extends into core 24 and is tapered inwardly to terminate in a vertical bore 28. Bore 28 extends upwardly from slot 26 and terminates in a second horizontal slot 30 which is diamond-shaped in cross section. Slot 30 extends away from bore 28 and is tapered outwardly to terminate at the face of core 24 adjacent the diamond-shaped cross sectional area 22 of outlet opening 20. The cross sectional areas of slot 30 and area 22 at their point of intersection are substantially the same. Furthermore, the horizontal length of slot 30 in the face of core 24 is slightly shorter than the corresponding length of slot 26.

A post 32 is rigidly secured to the top of bore 24 and extends vertically therefrom. A conventional sealing gasket 34 is adapted to fit over the top of housing 10, as shown in Fig. 1. A cap member 36, with a hole in its center is adapted to fit over post 32 and to rest upon the top of housing 10. Cap 36 is detachably secured to housing 10 in any convenient manner such as by a plurality of bolts 38 which extend through cap 36 and gasket 34 to be threadedly secured to the top of the housing. This structure is also shown in Fig. 1. Cap 36 has a circular shoulder 40 around but in spaced apart relation to the hole in its center. A plug 42 is adapted to be rotatably inserted over post 32 to frictionally engage shoulder 40 so as to seal the space 44 formed by cap 36, shoulders 40 and the plug 42. Space 44 can be filled with lubricant to provide a grease gland which will reduce any friction between post 32 and cap 36 or plug 42. Furthermore, this grease gland is capable of gradually secreting lubricant down post 32 through the hole in cap 36 to the top and sides of core 24. Of course, the rotation of core 24 within housing 10 by the turning of post 32 stimulates this function. Arm 46 is detachably secured to the top of post 32 in any convenient manner and extends laterally therefrom. Arm 46 will facilitate the turning of post 32 and core 24 with respect to housing 10.

The normal operation of my device is as follows: The intake conduit 16 is secured into inlet opening 14 on housing 10. The outlet conduit is similarly secured within opening 20 on the opposite side of the housing. The core can then be turned by arm 46 and post 32 to the closed position shown in Fig. 4. When the fluid or gas pressure system is introduced into conduit 16, the pressurized gas or fluid will attempt to move in the direction of the arrows shown in Fig. 1.

The following operation will be described as though a fluid under pressure were being used in the system, but the conduct of a gas in the system will be very similar.

As the core 24 is rotatably moved within housing 10 from its closed position in Fig. 4 to its open position in Fig. 3, it will be observed that, since slot 26 is horizontally longer than slot 30, slot 26 will begin to register with inlet hole 14 before slot 30 begins to register with area 22 of outlet opening 20. This will permit the slots 26 and 30 and bore 28 to fill with fluid before any fluid can be discharged from the core into area 22. The reason for this arrangement is that if the inlet and outlet openings of core 24 simultaneously registered to a slight degree with the pressure conduits 16 and 21, respectively, a lapse of time would take place before any fluid would be discharged from the core because slots 26 and 30 and bore 28 would first have to be substantially filled with fluid. But under the existing arrangements, fluid will be immediately discharged from the valve whenever it is opened.

It will be noted that as the core is being opened, the outlet opening will be composed of the slightly overlapping tips of the diamond shaped cross sectional areas of slot 30 and area 22. It can be seen that a slight overlapping of these respective "diamonds" could result in a very small opening, and that as the "diamonds" are moved over each other, the effective flow area created thereby can be increased many times over what the original setting may have been. But where the outlet opening has been increased by the overlapping "diamonds" the inlet opening has been increased at even a greater rate by overlapping circles, namely, opening 14 and the circular ends of slot 26. It should be noted that the valve can be opened from a closed or infinitesimal flow to full flow by turning the core 24 less than 90 degrees.

Slots 26 and 30 are tapered towards the center of the core to better control the jet of fluid that sprays into the inlet opening. It can be easily seen in Fig. 3 that if a slot extended from the outside ends of slot 26 directly over to the outside ends of slot 30, that the jet of fluid from a small inlet opening would spray uncontrollably all over the interior of the core and would not necessarily immediately go to the correspondingly smaller outlet opening. Also, the tapered slots 26 and 30 help to keep the force of the inlet jet from rotating the core by directing the jet to the middle of the core. The vertical bore 28 assists in "taming" the inlet jet as the fluid moves from slot 26 to slot 30.

Thus, it can be seen that my invention provides a valve whose rate of flow can be sensitively adjusted by a very small corresponding displacement of the manual control means. It is further seen that a slight movement of my manual control means will completely open my valve from its closed position. It is further observed that my valve can provide a wide range of flow valves and that the lubricating gland 44 and grease nipple 12 make the valve essentially self-lubricating. Therefore, my invention has accomplished all of its stated objects.

By the shape of the slot openings, and tapered valve core and case, considerable wear and tolerances can be compensated for automatically. Also by my construction vibrations and hammering of the valve are eliminated. Furthermore, there are no internal threads nor small valve stem to support a large valve head.

Some changes may be made in the construction and arrangement of my pressure valve without departing from the real spirit and purpose of my invention, and it is my intention to cover by my claims, any modified forms of structure or use of mechanical equivalents which may be reasonably included within their scope.

I claim:

1. In a valve, a housing having inlet and outlet openings, said inlet and outlet openings existing at different elevations and adapted to be placed in series with a pressure system, a core rotatably secured in said housing, first and second horizontal elongated slots extending into said core and capable of having their outside ends register at times with said inlet and outlet openings, respectively; said first slot being wider than said second slot, a bore in said core connecting said first and second slots, said first and second slots having different cross sectional areas, said inlet and outlet openings having different cross sectional areas, said second slot and said outlet opening being diamond shaped in cross section, at least said first slot being tapered inwardly towards the center of said core, and means for selectively rotating said core in said housing.

2. In a valve, a housing having inlet and outlet openings, said inlet and outlet openings adapted to be placed in series with a pressure system, a core rotatably secured in said housing, first and second elongated slots communicating with each other and extending through said core, said first and second slots capable of having their outside ends register at times with said inlet and outlet openings, respectively; said first and second slots having different cross sectional areas, said inlet and outlet openings having different cross sectional areas, said first slot having a horizontal width greater than the horizontal width of said second slot as measured on the outside surface of said core, said second slot and said outlet opening being diamond shaped in cross section, at least said first slot being tapered inwardly toward the center of said core, and means for selectively rotating said core in said housing about the vertical axis of said core.

References Cited in the file of this patent

UNITED STATES PATENTS

| 1,004,845 | Bohme | Oct. 3, 1911 |
| 1,049,898 | Moneuse | Jan. 7, 1913 |
| 1,550,725 | Jung | Aug. 25, 1925 |
| 1,638,152 | Gabriel | Aug. 9, 1927 |
| 2,078,402 | McDonough | Apr. 27, 1937 |
| 2,540,668 | Haun | Feb. 6, 1951 |
| 2,554,040 | Long | May 22, 1951 |
| 2,564,223 | Long | Aug. 14, 1951 |

FOREIGN PATENTS

| 134,556 | Austria | Aug. 25, 1933 |